United States Patent
Kotulla

(10) Patent No.: US 8,540,390 B2
(45) Date of Patent: Sep. 24, 2013

(54) ILLUMINATION SYSTEM FOR A WALL, A CEILING, OR A FLOOR

(76) Inventor: Carmen Kotulla, Stuttgart (DE)

(*) Notice: Subject to any disclaimer, the term of this patent is extended or adjusted under 35 U.S.C. 154(b) by 1062 days.

(21) Appl. No.: 11/661,625

(22) PCT Filed: Sep. 1, 2005

(86) PCT No.: PCT/DE2005/001529
§ 371 (c)(1),
(2), (4) Date: Mar. 14, 2008

(87) PCT Pub. No.: WO2006/024285
PCT Pub. Date: Mar. 9, 2006

(65) Prior Publication Data
US 2008/0253111 A1 Oct. 16, 2008

(30) Foreign Application Priority Data
Sep. 3, 2004 (DE) .......... 10 2004 043 194

(51) Int. Cl.
*F21S 8/00* (2006.01)
*E01F 9/00* (2006.01)

(52) U.S. Cl.
USPC ...................... 362/153; 362/153.1

(58) Field of Classification Search
None
See application file for complete search history.

(56) References Cited

U.S. PATENT DOCUMENTS

| 5,335,151 | A | * | 8/1994 | Dahlberg | 362/153.1 |
| 5,515,243 | A | | 5/1996 | Cassarly et al. | |
| 6,155,703 | A | * | 12/2000 | Rizkin et al. | 362/551 |
| 6,231,206 | B1 | * | 5/2001 | Hervey et al. | 362/153 |
| 2003/0156405 | A1 | * | 8/2003 | Kim | 362/153.1 |

FOREIGN PATENT DOCUMENTS

| DE | 19540368 A1 | 5/1997 |
| DE | 19547267 A1 | 7/1997 |
| FR | 2172568 A | 9/1973 |
| FR | 2174380 A | 10/1973 |
| FR | 2726069 A | 4/1996 |

OTHER PUBLICATIONS

International Search Report dated May 4, 2006.

* cited by examiner

*Primary Examiner* — Sean Gramling
(74) *Attorney, Agent, or Firm* — Howard IP Law Group, PC

(57) ABSTRACT

The invention relates to an illumination system for a wall, a ceiling or a floor (5), comprising at least one point-type light-emitting body (2), which is connected to a light source by means of a fiber-optic (4) and which when mounted is recessed in relation to a surface (6) of the wall, the ceiling or the floor (5). Said system also comprises a transparent protective body (3), which when mounted covers the light-emitting body (2) on the surface (6) side and lies flush with said surface (6).

11 Claims, 2 Drawing Sheets

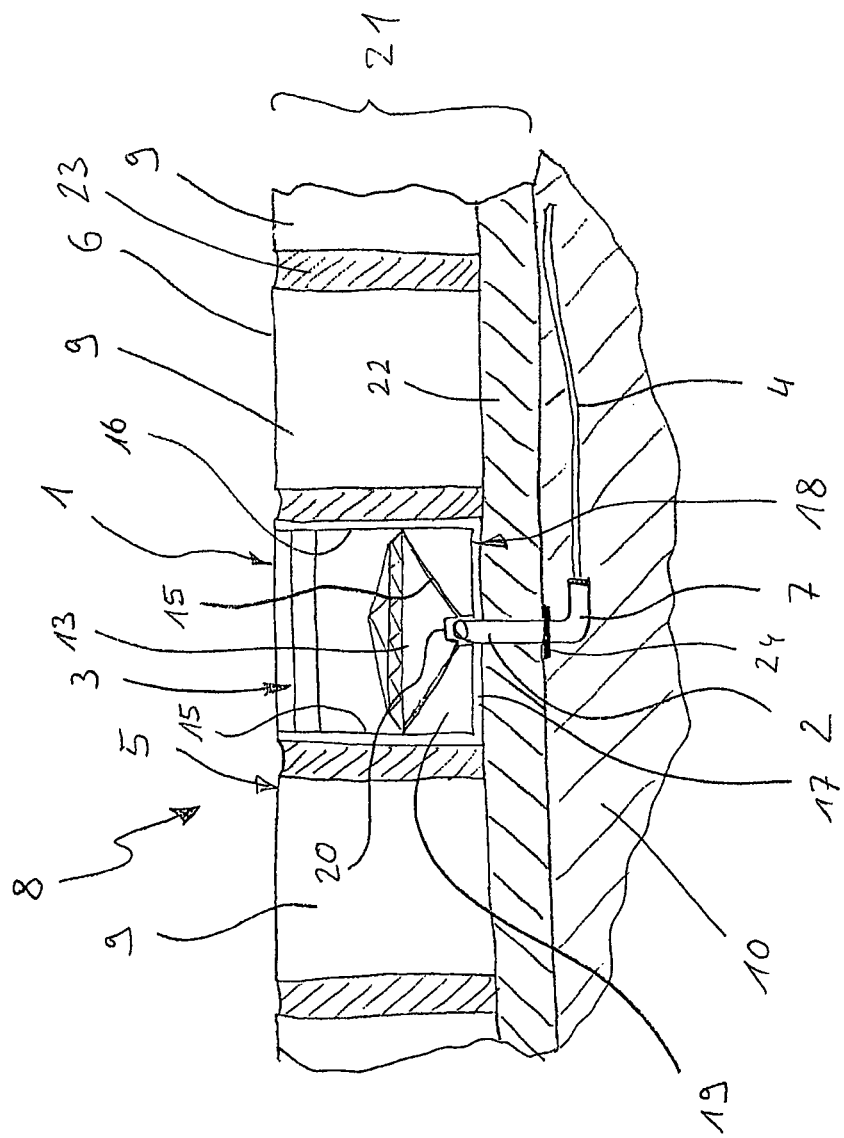

ILLUMINATION SYSTEM FOR A WALL, A CEILING, OR A FLOOR

Figure 1:
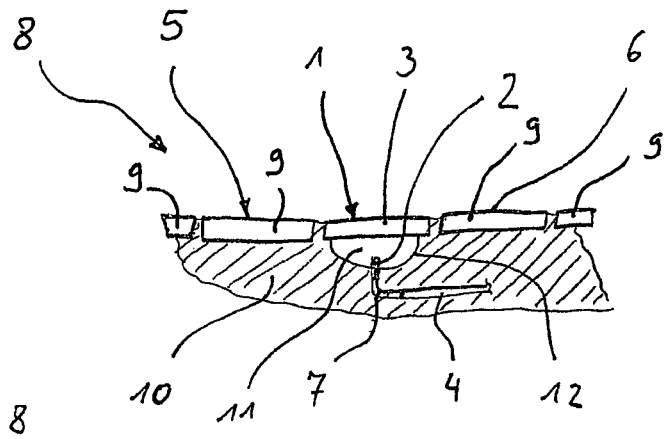

The present invention relates to an illumination system for a wall, a ceiling or a floor.

Illumination is often used to give architectural form to rooms by means of light effects. It is common to arrange lamps, as a rule light bulbs, flush with a ceiling or with a floor of the room.

It is the object of the present invention to provide an improved design for an illumination system of the type mentioned in the introduction, which improved design makes it possible, in particular, to achieve additional special light effects on the wall, on the ceiling or on the floor.

According to the invention this object is met by the subject of the independent claim. Advantageous embodiments are set out in the dependent claims.

The invention is based on the general idea of using light-emitting bodies that are known per se for generating point-type light emissions on a wall, on a ceiling or on a floor, which light-emitting bodies are connected to a light source by way of an optical fibre. In this arrangement the use of these light-emitting bodies is made possible by special light-transmitting protective bodies which when mounted cover the respective light-emitting body towards a surface of the wall, the ceiling or the floor, and which are recessed in relation to the surface. The design according to the invention can reduce the danger of the light-emitting bodies being damaged by contact with hard objects. In particular, the design according to the invention makes it possible to arrange such light-emitting bodies, which are fed by way of optical fibres, in a floor or in a wall, where the danger of damage as a result of contact is particularly great. Furthermore, the protective body makes it possible to integrate the light-emitting bodies in a visually attractive manner into the wall, the ceiling or the floor.

Preferably, the protective body is designed so as to be water-resistant and/or able to be walked on, and, furthermore, when mounted is installed in the wall, ceiling or floor so as to be water-resistant and/or able to be walked on. Because of the protective body that can be walked on, the light-emitting bodies can be integrated into floors without any further ado, which makes it possible to achieve special design effects and architectural effects. As a result of the water-resistant design and installation of the protective body, said protective body can also be installed in wet areas and humid zones without any further ado. In particular, an arrangement under water or positioning where water flows over it is also possible.

Further important characteristics and advantages of the invention are stated in the subordinate claims, in the drawings and in the associated description of the figures with reference to the drawings.

It is understood that the above-mentioned features and those still to be explained can not only be used in the respectively stated combination, but also in other combinations or on their own, without leaving the scope of the present invention.

Preferred embodiments of the invention are shown in the drawings and are explained in more detail in the following description, wherein identical, functionally identical or similar components have the same reference characters.

The following are diagrammatically shown:

FIGS. 1 to 5 diagrammatic cross sections of a wall, a ceiling or a floor with the illumination system according to the invention.

According to FIGS. 1 to 5, an illumination system 1 according to the invention comprises a point-type light-emitting body 2 and a light-transmitting protective body 3. The light-emitting body 2 is of a "point-type" because it makes it possible for the light to be emitted in a point-type shape. Of course, the point-type light emission can be diffused in a targeted manner by corresponding optics. The light-emitting body 2 is connected to an optical fibre 4, e.g. a glass fibre, which in turn can be connected, or when installed is connected, to a light source (not shown in the drawings).

In the illustrations provided, the illumination system 1 is mounted, in other words the illumination system 1 is installed in a wall, a ceiling or a floor 5. In the installed state the light-emitting body 2 is recessed in relation to a surface 6 of the wall, the ceiling or the floor 5. Furthermore, the optical fibre 4 extends at a distance from the surface 6, essentially parallel in relation to said surface 6. In order to achieve the lowest possible design height of the illumination system 1, in the drawings the light-emitting body 2 further comprises a deviation section 7 which deflects the optical fibre 4, or at least the light fed in, by approximately 90°. In this way it is possible on the one hand to feed the optical fibre 4 parallel to the surface 6 right up to the light-emitting body 2, and on the other hand to position the light-emitting body 2 so that its direction of light radiation is perpendicular in relation to the surface 6. This positioning of the light emitting body 2 makes it possible to achieve optimum light effects.

In the installed state shown, the protective body 3 is arranged in the wall, the ceiling or the floor 5 such that it covers the light-emitting body 2 towards the surface 6 and in this way is positioned so that it lies flush with said surface 6. In this way the light-emitting body 2 is protected from damaging influences.

The protective body 3 is designed to be able to be walked on, is water-resistant and preferably scratch-resistant, and is installed in this manner in the wall, the ceiling or the floor 5. Preferably, the protective body 3 comprises glass, preferably security glass or highly-resistant glass. Likewise, the protective body can comprise synthetic glass. Furthermore, it may be sensible to produce the protective body 3 using a double layer of glass, in particular a multilayer glass. This makes it possible, for example, to replace the outer glass layer as required, for example after corresponding wear and tear.

In the embodiments shown in the drawings, as an example and without any limitation to the general character, the wall, the ceiling or the floor 5 is designed as a mosaic 8 in the region of the protective body 3, with said mosaic comprising a multitude of individual mosaic elements 9. In the present context the term "mosaic" 8 refers to an arrangement of mosaic elements 9 which as far as their form, colour, material and size are concerned can differ from each other in size and in their totality can create an artistic, graphic or image-like visual overall impression. The mosaic elements 9 used for this purpose are typically relatively small, as a rule their diameter is less than 5 cm, preferably less than 2 cm, e.g. between 0.5 cm and 1.5 cm.

As shown in FIGS. 1 to 5, in a top view of the surface 6, the protective body 3 has essentially the same dimensions as the mosaic elements 9. With this design the protective body 3 is ideally integrated into the mosaic 8. At the same time in this manner the illumination system 1 can generate a special creative light-effect within the mosaic 8. In this arrangement the individual mosaic elements 9 and the protective body 3 can be held in a bed 10 that comprises a suitable cement or adhesive. The light-emitting body 2 and the optical fibre 4 can also be embedded in this bed 10.

In the embodiment according to FIG. 1, on a side of the protective body 3 which side faces away from the surface 6 a hollow space 11 is arranged, into which the light-emitting body 2 protrudes in order to be able to radiate its light through the protective body 3 during operation. Furthermore, in this arrangement a type of reflector 12 can be provided, which focuses the light emitted by the light-emitting body 2 in a predefined direction and/or deflects the light in the direction of the protective body 3.

Figure 2:
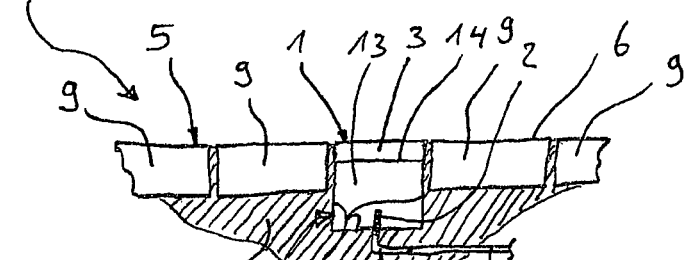
Figure 3:
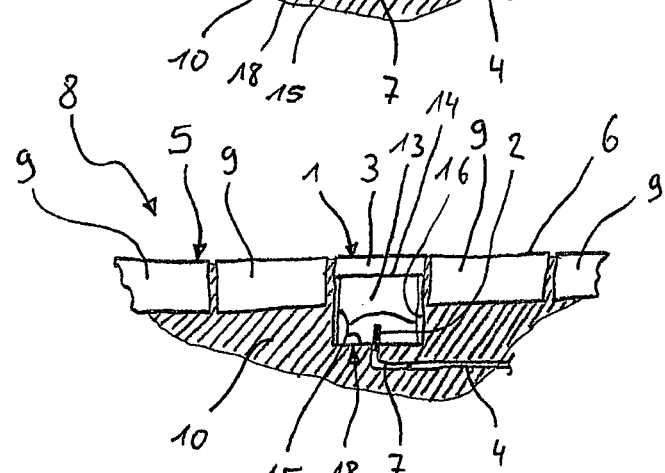
Figure 4:
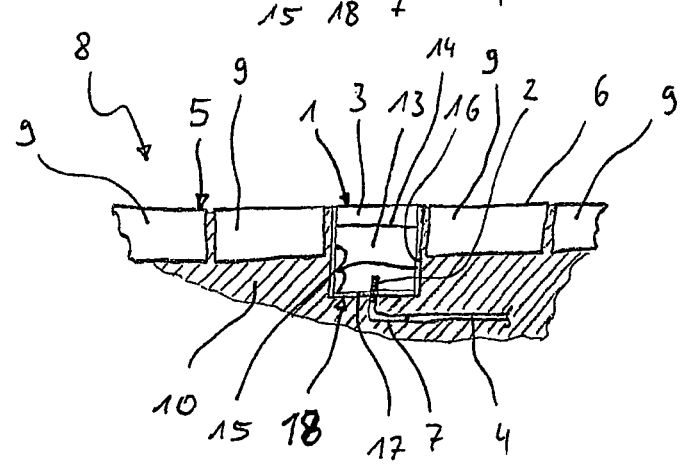

In the exemplary embodiments of FIGS. 2 to 4 the illumination system 1 further comprises a prism 13 which when installed, as shown, is installed in the wall, in the ceiling or in the floor 5, namely on a side of the protective body 3, which side faces away from the surface 6. This prism 13 is connected to the light-emitting body 2 in order to input into the prism 13 the light that is emitted by the light-emitting body 2 during operation.

The prism 13 preferably comprises a cut and/or facetted crystal body, glass body or precious-stone body, e.g. diamond body. In this way it is possible to achieve spectacular light refraction effects, in particular optical depth effects, which further improves the design options provided by means of the illumination system 1 according to the invention.

Furthermore, apart from a light-emitting side 14 that faces the protective body 3, the prism 13 can optionally be metal-coated on the inside, at least over part of its surface. In FIGS. 2 to 5 such metal-coating is designated 15. By means of metal coating 15 the light emission on the light-emission side 14 is improved. At the same time additional advantageous reflection effects result. Furthermore, the metal coating 15 prevents undesirable colouring as a result of the adjacent bed 10 or the adjacent mosaic elements 9 having a negative influence on the light effect of the illumination system 1.

In principle, the prism 13 can be connected to the protective body 3 so as to be fixed. In this way always the same relative position between the prism 13 and the protective body 3 can be ensured in order to define additional diffraction effects that can occur at the location of the transition of light between the prism 13 and the protective body 3. For example an adhesive material that is light-resistant and light-transmitting can be used to establish a connection between the protective body 3 and the prism 13. Furthermore, this adhesive can be applied and cures without blister formation. Expediently the adhesive is a permanently elastic adhesive in gel form.

However, an arrangement is preferred in which there is a space between the prism 13 and the protective body 3, which is shown more clearly in the embodiment of FIG. 5.

In the embodiments of FIGS. 3 to 5 the prism 13 is, furthermore, enclosed by a light-impervious sleeve 16. In this way visual interference by the bed 10 and/or by the adjacent mosaic elements 9 can be excluded. Furthermore, the sleeve 16 can comprise metal-coating 15 on the inside. In the embodiment according to FIG. 3 the sleeve 16 only encloses the prism 13 so that the protective body 3 is placed onto the prism 13 and onto the sleeve 16.

In a design that differs from the above, in the embodiment shown in FIGS. 4 and 5, the sleeve 16 can furthermore enclose the protective body 3. In this way an additional design element can be achieved on the surface 6. Furthermore, in this way affixation of the protective body 3 relative to the prism 13 can be simplified. Moreover, on a side facing away from the protective body 3, the sleeve 16 can comprise a light-impervious bottom 17, which is indicated in FIG. 4. The light-emitting body 2 is then connected to the prism 13 through this bottom 17.

The sidewalls of the sleeve 16 can preferably be metal-coated in order to improve the light effects.

Preferably, the protective body 3, the prism 13 and the light-emitting body 2 form a unit 18 that can be pre-assembled. By means of such units 18 the integration of the illumination system 1 into the wall, the ceiling or the floor 5 can be significantly simplified because these units 18 can simply and economically be prefabricated in a dedicated production facility. At the same time handling of the illumination system 1 is simplified because its units 18 can be manipulated considerably more easily in order to position them at the corresponding locations in the wall, the ceiling or the floor 5. Expediently, the sleeve 16 also forms part of this unit 18. In this way pre-assembly of the unit 18 is simplified because the sleeve 16 can then act as a carrier for the remaining components.

Preferably, the protective body 3 comprises glass, in particular multilayer glass or synthetic glass.

The sleeve 16 and/or its bottom 17 preferably comprise/s glass, plastic material or metal. The sleeve 16 and/or the protective body 3 are expediently formed so as to be complementary to the external contour of the prism 13. For example, the prism 13, protective body 3 and sleeve 16 in top view comprise a round, oval circular, polygonal, rectangular or square contour.

As shown in FIG. 5, in a preferred embodiment the prism 13 is arranged so as to be spaced apart from the protective body 3, which in the embodiment shown is made from a double layer of glass. In this arrangement the prism 13 is fixed in the sleeve 16. For this purpose the sleeve 16 comprises, for example, a mounting 19 that is shaped so as to complement the prism 13, wherein said mounting 19 can be metal-coated on a side facing the prism 13. Likewise, the sleeve 16 is also preferably designed so that its interior wall is metal-coated. In this diagram too, metal-coated parts are designated 15.

The light-emitting body 2 protrudes into the sleeve 16. It is worth noting that at its side facing the light-emitting body 2, the prism 13 comprises a recess 20 that improves light input into the prism 13.

In order to install the mosaic 8 the entire mosaic 8 or, preferably, a sheet-like partial region of the mosaic 8 is prefabricated in the form of an installation unit, which in the diagram is indicated by a curly bracket and is designated 21. This installation unit 21 comprises a carrier plate 22 which can, for example, be sandwich-type plasterboard, pressboard or the like. On this carrier plate 22 the individual mosaic elements 9 and the units 18 of the illumination system 1 are attached in a suitable manner, for example by means of an adhesive. Gap filling 23 can also have been provided already in the process of manufacturing the installation unit 21. As an alternative, gap filling 23 can be carried out later, when the installation unit 21 is installed on the floor 5 or on the wall or ceiling. Furthermore, the installation unit 21 comprises the light-emitting bodies 2, which for this purpose have been inserted into the carrier plate 22 through corresponding plug-in apertures, and which are affixed to the carrier plate 23, for example by means of a collar 24. The optical fibres 4 can then be attached to the carrier plate 22 in a suitable manner. In this way it is possible to prepare or prefabricate, by means of the installation units 21, even a relatively large-area mosaic 8 by means of mosaic segments so that the installation of the mosaic 8 is significantly simplified. Furthermore, the production of the installation units 21 can be simplified by prefabricating the units 18.

In the exemplary embodiment shown in FIG. 5 both the protective body 3 and the prism 13 are attached, in particular bonded, to the sleeve 16. In this way the prism 13 and the protective body 3 are attached to each other by way of the sleeve 16.

The invention claimed is:
1. An illumination system for a wall, a ceiling or a floor, comprising at least one point-type light-emitting body, which is connected to a light source by means of an optical fiber and which when mounted is recessed in relation to a surface of the wall, the ceiling or the floor, a light-transmitting protective body which when mounted covers the light-emitting body towards the surface and is positioned so as to be recessed in relation to the surface, and a facetted diamond-shaped body connected to the protective body by way of a sleeve, positioned in the wall, in the ceiling or in the floor, on a side facing away from the surface of the protective body, wherein the diamond-shaped body is connected to the light-emitting body in order to input light, the diamond-shaped body comprising a body which is facetted in order to achieve light refraction, and wherein the body of the diamond-shaped body is made of at least one of crystal, glass and precious-stone, and wherein the sleeve comprises a light-impervious bottom through which the light-emitting body is connected to the diamond-shaped body, and wherein the wall, the ceiling or the floor is designed as a mosaic in the region of the protective body, with said mosaic comprising a multitude of individual mosaic elements, the mosaic comprising at least one installation unit that has a carrier plate on which at least part of the mosaic is pre-assembled and on which the associated light-emitting body is attached.

2. The illumination system according to claim 1, wherein the protective body is designed so as to be at least one of water-resistant, able to be walked on, and scratch-resistant, and when mounted is installed in the wall, the ceiling or the floor so as to be at least one of water-resistant, able to be walked on, and so as to be scratch-resistant.

3. The illumination system according to claim 1, wherein the protective body comprises glass, security glass, highly-resistant glass or synthetic glass.

4. The illumination system according to claim 1, wherein the diamond-shaped body is arranged so as to be spaced apart from the protective body.

5. The illumination system according to claim 1, wherein apart from its light-emitting side that faces the protective body, the diamond-shaped body, is metal-coated on the inside, at least over part of its surface.

6. The illumination system according to claim 1, wherein at least one of the protective body and the diamond-shaped body are affixed to the sleeve by means of a light-resistant, light-transmitting adhesive that cures without blister formation.

7. The illumination system according to claim 1 wherein the diamond-shaped body is enclosed by the light-impervious sleeve.

8. The illumination system according to claim 7, wherein the sleeve furthermore encloses the protective body.

9. The illumination system according to claim 1, wherein the protective body, the diamond-shaped body and the light-emitting body form a unit that can be pre-assembled.

10. The illumination system according to claim 1, wherein the light-emitting body comprises a deviation section which deflects the light fed in and/or the optical fiber by approximately 90°.

11. The illumination system according to claim 1, wherein in a top view of the surface, the protective body has essentially the same dimensions as the mosaic elements.

* * * * *